(12) United States Patent
Griffin et al.

(10) Patent No.: US 12,580,938 B2
(45) Date of Patent: Mar. 17, 2026

(54) CONDITIONAL HYPOTHESIS GENERATION FOR ENTERPRISE PROCESS TREES

(71) Applicant: INTERNATIONAL BUSINESS MACHINES CORPORATION, Armonk, NY (US)

(72) Inventors: Adam Lee Griffin, Cohasset, MN (US); Balaji Muthusamy Pandurangan, Amstelveen (NL); Santosh Rajashekar, Bangalore (IN); Richard Daniel Gunjal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 18/513,777

(22) Filed: Nov. 20, 2023

(65) Prior Publication Data

US 2025/0168182 A1 May 22, 2025

(51) Int. Cl.
*G06F 21/00* (2013.01)
*H04L 9/40* (2022.01)
(52) U.S. Cl.
CPC ................................. *H04L 63/1425* (2013.01)
(58) Field of Classification Search
CPC .................................................. H04L 63/1425
See application file for complete search history.

(56) References Cited

U.S. PATENT DOCUMENTS

| | | | |
|---|---|---|---|
| 8,494,987 B2 | 7/2013 | Katukuri | |
| 9,047,562 B2 | 6/2015 | Okabe | |
| 9,785,755 B2 | 10/2017 | Riabov | |
| 10,324,983 B2 | 6/2019 | Leeman-Munk | |
| 11,019,092 B2 | 5/2021 | Satish | |
| 11,082,434 B2 | 8/2021 | Ravindra | |
| 11,089,040 B2 | 8/2021 | Jang | |
| 12,321,356 B1 | 6/2025 | Griffin et al. | |
| 2010/0131334 A1* | 5/2010 | Firminger | G06Q 10/10 705/7.42 |
| 2010/0138368 A1* | 6/2010 | Stundner | G06N 20/00 706/47 |
| 2012/0047099 A1* | 2/2012 | Chang | G06Q 30/02 706/21 |

(Continued)

OTHER PUBLICATIONS

IBM, "IBM Security QRadar EDR", https://www.ibm.com/products/qradar-edr, Accessed on Nov. 1, 2023, 14 pages.

(Continued)

*Primary Examiner* — Michael M Lee

(74) *Attorney, Agent, or Firm* — Tihon Poltavets

(57) ABSTRACT

An embodiment for conditional hypothesis generation for enterprise process trees. The embodiment may receive a set of observed data. The embodiment may map the set of observed data with accessible historical data. The embodiment may perform conditional reasoning to determine, based on a process tree context for the set of observed data, functionality associated with the observed data and identify a series of alternative actions which, when performed, result in the determined functionality. The embodiment may generate, based on the mapped set of observed data and the identified series of alternative actions, a conditional hypothesis corresponding to a process flow.

17 Claims, 5 Drawing Sheets

(56) References Cited

U.S. PATENT DOCUMENTS

| | | | | |
|---|---|---|---|---|
| 2020/0167464 | A1 | 5/2020 | Griffin | |
| 2021/0279614 | A1* | 9/2021 | Kimura | G06N 5/041 |
| 2021/0312309 | A1 | 10/2021 | Yamamoto | |
| 2023/0054774 | A1* | 2/2023 | Brons | G06F 16/906 |

OTHER PUBLICATIONS

IBM, "IBM Security QRadar Suite", https://www.ibm.com/qradar, Accessed on Nov. 1, 2023, 9 pages.
IBM, "IBM Security Randori Recon", https://www.ibm.com/products/randori-recon, Accessed on Nov. 1, 2023, 8 pages.
Puzis, et al., "Attack Hypothesis Generation", ResearchGate, Nov. 2019, 9 Pages. https://www.researchgate.net/publication/341928317_Attack_Hypothesis_Generation.

\* cited by examiner

100

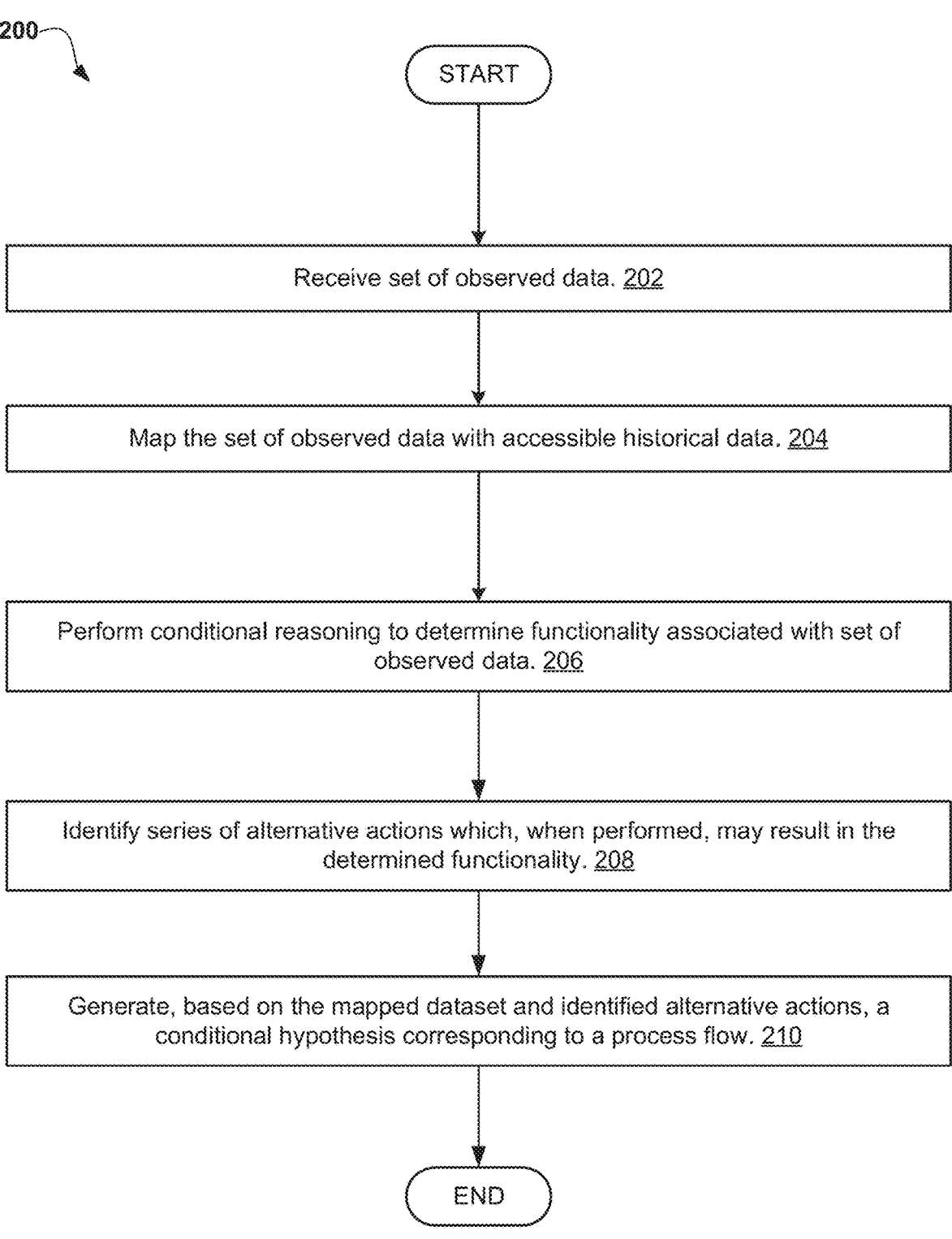

200

START

Receive set of observed data. 202

Map the set of observed data with accessible historical data. 204

Perform conditional reasoning to determine functionality associated with set of observed data. 206

Identify series of alternative actions which, when performed, may result in the determined functionality. 208

Generate, based on the mapped dataset and identified alternative actions, a conditional hypothesis corresponding to a process flow. 210

END

Figure 2

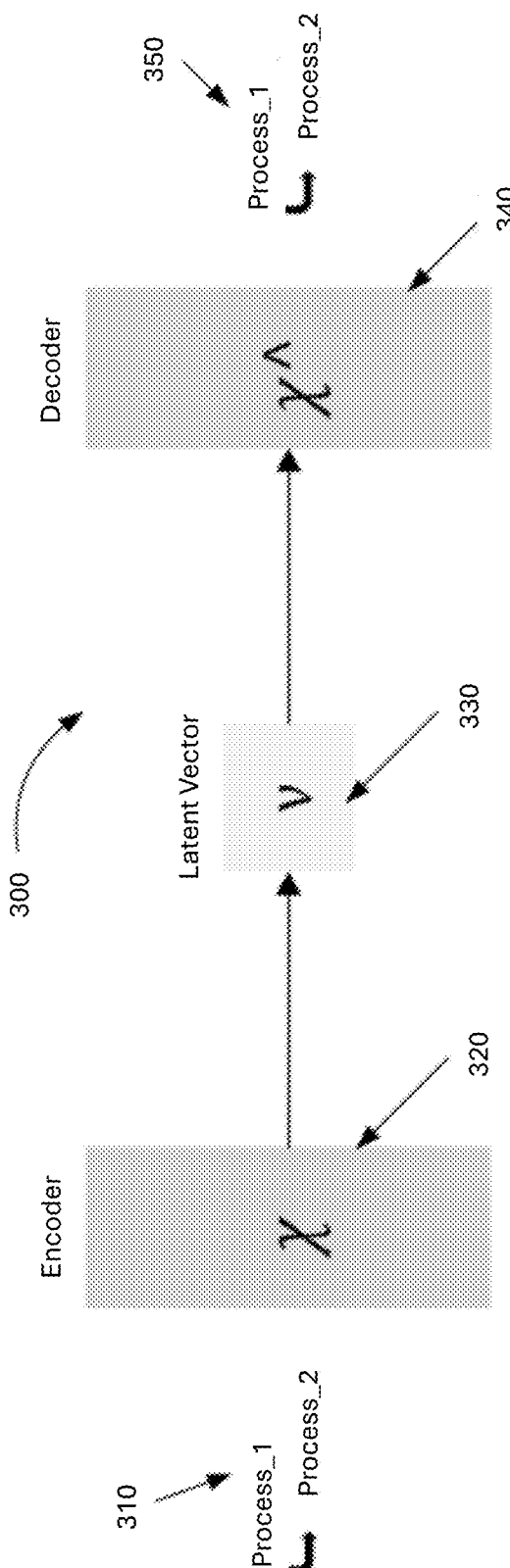
Figure 3

CONDITIONAL HYPOTHESIS GENERATION FOR ENTERPRISE PROCESS TREES

BACKGROUND

The present application relates generally to computer processing, and more particularly, to conditional hypothesis generation for enterprise process trees.

Many conventional computer security techniques detect known cyber-attacks by using preconfigured tooling and collecting and analyzing data in log files from network devices, host assets, and operating systems. In many instances, employed computer security techniques may leverage process trees which provide hierarchical representations of processes that are currently active or have been active to track parent-child relationships between processes and gain valuable insight into the behavior of various applications and system components. Conventional computer security techniques may then identify possible malicious activities by employing a rule-based or a statistical correlation engine to determine associations between events in a computer system, or by analyzing user activities and behaviors. Businesses constantly strive to employ increasingly effective and versatile computer security techniques.

SUMMARY

According to one embodiment, a method, computer system, and computer program product for conditional hypothesis generation for enterprise process trees is provided. The embodiment may include receiving a set of observed data. The embodiment may also include mapping the set of observed data with accessible historical data. The embodiment may further include performing conditional reasoning to determine, based on a process tree context for the set of observed data, functionality associated with the observed data, and to identify a series of alternative actions which, when performed, result in the determined functionality. The embodiment may also include generating, based on the mapped set of observed data and the identified series of alternative actions, a conditional hypothesis corresponding to a process flow.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates an operational flowchart for an exemplary process of conditional hypothesis generation for enterprise process trees according to at least one embodiment; and FIG. 3 illustrates exemplary model architecture including an exemplary encoder-decoder model that may be leveraged during exemplary processes of conditional hypothesis generation for enterprise process trees according to at least one embodiment;

DETAILED DESCRIPTION

Figure 1:
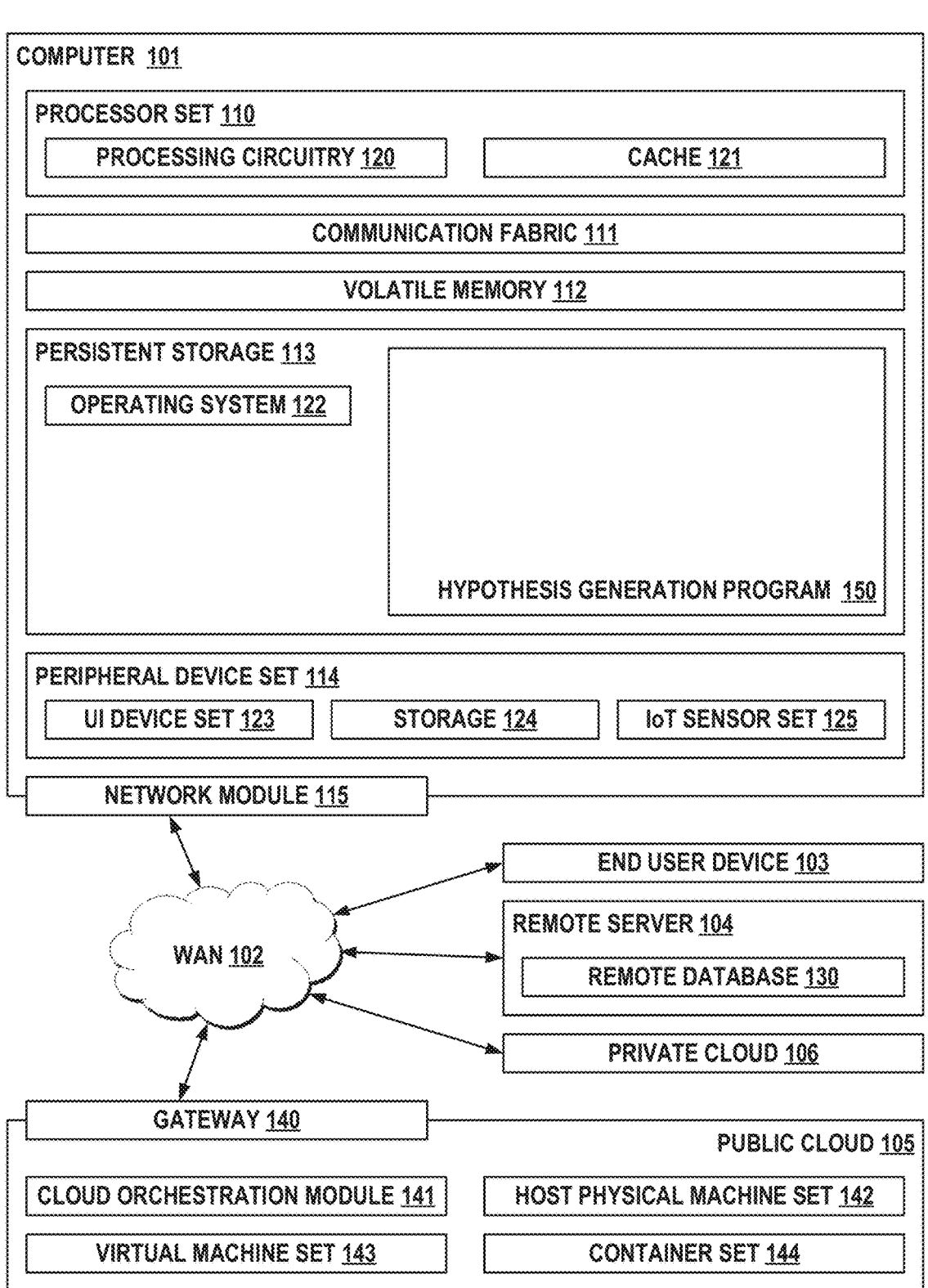
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to conditional hypothesis generation for enterprise process trees. The following described exemplary embodiments provide a system, method, and program product to, among other things, receive a set of observed data, map the set of observed data with accessible historical data, perform conditional reasoning to determine, based on a process tree context for the set of observed data, functionality associated with the observed data, and identify a series of alternative actions which, when performed, result in the determined functionality, and then generate, based on the mapped set of observed data and the identified series of alternative actions, a conditional hypothesis corresponding to a process flow.

As previously described, many conventional computer security techniques detect known cyber-attacks by using preconfigured tooling and collecting and analyzing data in log files from network devices, host assets, and operating systems. In many instances, employed computer security techniques may leverage process trees which provide hierarchical representations of processes that are currently active or have been active to track parent-child relationships between processes and gain valuable insight into the behavior of various applications and system components. Conventional computer security techniques may then identify possible malicious activities by employing a rule-based or a statistical correlation engine to determine associations between events in a computer system, or by analyzing user activities and behaviors. Businesses constantly strive to employ increasingly effective and versatile computer security techniques.

However, many conventional computer security techniques are often limited to being reactive based only upon actual observed data gathered by a target system being monitored. Accordingly, typical computer security techniques respond to cyber-attacks based on limited sets of knowledge without a proper guided approach for a given threat. Furthermore, conventional computer security techniques are limited by the observed data in their ability to allow for proactive threat detection, to perform anomaly detection, and to continuously improve and learn to address evolving threats in a timely manner. Thus, conditional hypothesis generation for enterprise process trees would be advantageous for improving computer security techniques employed by businesses seeking to engage in optimal cyber-security threat detection that is both proactive and effective in mitigating potential malicious activity.

Accordingly, a method, computer system, and computer program product for conditional hypothesis generation for enterprise process trees is provided. The method, system, and computer program product may receive a set of observed data. The method, system, computer program product may map the set of observed data with accessible historical data. The method, system, computer program product may then perform conditional reasoning to determine, based on a process tree context for the set of observed data, functionality associated with the observed data, and identify a series of alternative actions which, when performed, result in the determined functionality. Thereafter, the method, system, computer program product may generate, based on the mapped set of observed data and the identified series of alternative actions, a conditional hypothesis corresponding to a process flow. In turn, the method, system, computer program product has provided for conditional hypothesis generation for enterprise process trees that may be leveraged by computer security techniques for improved threat detection. Described embodiments allow for conditional hypothesis generation that produces alternate possibilities (process flows) by leveraging similar contexts to original process trees associated with the received observed data. Described embodiments further leverage accessible historical data to further support hypothesis generation based on aligned and mapped semantics without deviating from original context. Furthermore, described embodiments may include feedback loops configured to store the generated hypotheses and process flows to continuously add to the available historical data to constantly improve the ability of described embodiments to perform conditional hypothesis generation. Thus, described embodiments may be leveraged to generate large volumes of alternate possibilities or process flows that may be utilized within improved computer security techniques or systems to engage in proactive threat detection, perform more efficient anomaly detection, and can continuously improve and learn to address evolving threats in a more timely manner.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as hypothesis generation program/code 150. In addition to hypothesis generation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and hypothesis generation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in hypothesis generation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in hypothesis generation program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the hypothesis generation program 150 may be a program capable of receiving a dialog system input for processing by a dialog system. Hypothesis generation program 150 may then map the set of observed data with accessible historical data. Next, hypothesis generation program 150 may perform conditional reasoning to determine, based on a process tree context for the set of observed data, functionality associated with the observed data, and identify a series of alternative actions which, when performed, result in the determined functionality. Thereafter, hypothesis generation program 150 may generate, based on the mapped set of observed data and the identified series of alternative actions, a conditional hypothesis corresponding to a process flow. In turn, hypothesis generation program 150 has provided for conditional hypothesis generation for enterprise process trees that may be leveraged by computer security techniques for improved threat detection. Described embodiments allow for conditional hypothesis generation that produces alternate possibilities (process flows) by leveraging similar contexts to original process trees associated with the received observed data. Described embodiments further leverage accessible historical data to further support hypothesis generation based on aligned and mapped semantics without deviating from original context. Furthermore, described embodiments may include feedback loops configured to store the generated hypotheses and process flows to continuously add to the available historical data to constantly improve the ability of described embodiments to perform conditional hypothesis generation. Thus, described embodiments may be leveraged to generate large volumes of alternate possibilities or process flows that may be utilized within improved computer security techniques or systems to engage in proactive threat detection, perform more efficient anomaly detection, and can continuously improve and learn to address evolving threats in a more timely manner.

Referring now to FIG. 2, an operational flowchart for an illustrative process 200 of conditional hypothesis generation for enterprise process trees according to at least one embodiment is provided.

At 202, hypothesis generation program 150 may receiving a set of observed data. In the context of this disclosure, the observed data generally refers to actual data that has been detected and stored by any target system being monitored for potential malicious activity. In embodiments, for example the observed data may correspond to computer processes and associated enterprise process trees derived from a target system being monitored for security threats. Generally, computer processes, such as launching applications and the order in which they execute, belong to the realm of unstructured and non-sequential data and can be analogized to a sentence in a natural language. A natural language sentence has multiple words strung together which require a syntactic disposition of nouns and verbs and other parts of speech. Specific parts of speech function as glue words that attach tokens with a higher semantic representation together in a coherent manner. Due to the complicated nature of a natural language, no single grammar can describe all possible variants. The analogous language of computer processes requires a syntactic and sematic grammatical order. Sequencing of computer processes may be capable of non-finite variation, but there are still meta-level (i.e., grammatical) requirements for invocation of the processes.

In embodiments, hypothesis generation program 150 may perform hypothesis generation to generate process tree data that may be leveraged by computer security systems which include an augmented threat detection system capable of learning the language of computer process execution and to apply that learning to threat detection. For example, it is envisioned that computer security systems capable of leveraging described embodiments may include an augmented threat response system generates a process tree, creates an embedding vector for each detailed process taxonomy of the process tree (i.e., vectorizes the process taxonomies), associates the taxonomies with running processes, and analyzes each process sub-tree and associated sub-trees to proactively determine whether the sub-trees represent a contextual sub-task that has the capability for malicious behavior (i.e., to recognize a threat vector).

At this step, hypothesis generation program 150 may receive a set of observed data which includes actual data associated with computer processes observed within a target system being monitored. For example, hypothesis generation program 150 may receive a set of observed data including the text string:

'cmd.exe/c "ping 127.0.0.1/../../../../../../../../../%System-Root%/system32/WindowsPowershell/v1.0/power-shel.exe-c'

In the above-example, the exemplary received set of observed data involves a process in which an actor used cmd.exe to leverage powershell.exe by using directory traversal techniques to ping 127.0.0.1, using '../' to pass an exemplary security mechanism to perform additional downstream processes. Hypothesis generation program 150 will ultimately further process and leverage the received observed data to ensure that the generated hypotheses (alternate process flows) will still share similar context with the process trees and computer process data associated with the observed (actual) datasets. The details of how the observed data may be leveraged is described in greater detail below.

At 204, hypothesis generation program 150 may map the set of observed data with accessible historical data. The accessible historical data may be stored, for example, in any suitable storage system, such as a database (not shown). At this step, hypothesis generation program 150 may compare and align the received observed data with the accessible historical data to identify similar patterns, trends, and similarities that may be leveraged during hypothesis generation to contribute to improved predictive capabilities during the processing of the generated hypotheses by a suitable threat detection system. At this step, hypothesis generation program 150 may be configured to utilize, for example, text to audio tools, text to video tools, data visualization tools, data mining algorithms, statistical analysis techniques, scatter plots, time series analysis, regression analysis, correlation analysis, and any other useful or suitable tools or techniques for performing data mapping. By mapping the set of observed data with accessible historical data, hypothesis generation program 150 may functionally determine if historical events have occurred in a similar context to that of the received observed data. In embodiments, this step may further include capturing and classifying variations of process tree trends and context from various historical incidents or alerts. The data processed and mapped at this step may be leveraged, as will be described in greater detail below, during hypothesis generation.

At step 206, hypothesis generation program 150 may then perform conditional reasoning to determine, based on a process tree context for the set of observed data, functionality associated with the observed data. At this step, hypothesis generation program 150 may leverage a semantic reasoner (as shown in FIG. 3, described below) to perform conditional reasoning on process data (including process tree data) in the received set of observed data to apply logical rules, inference mechanisms, and semantic querying to identify patterns, correlations, and dependencies between the processes in the set of observed data and determine associated functionalities. In embodiments, this conditional reasoning step may further include hypothesis generation program 150 leveraging the semantic reasoner to identify functional dependencies between process data in the set of observed data and the determined corresponding functionalities. For example, hypothesis generation program 150 may further leverage the semantic reasoner to analyze the semantic connections and reasoning results to determine specific functionalities associated with each process and uncover any conditional relationships or constrains that govern the behavior of each process. This logical step allows hypothesis generation program 150 to perform human-like analysis to determine the functionality associated with the set of observed data and corresponding process data and process trees. For example, returning to the example above, at this step hypothesis generation program may perform conditional reasoning on the set of observed data corresponding to:

'cmd.exe/c "ping 127.0.0.1/../../../../../../../../../%System-Root%/system32/WindowsPowershell/v1.0/power-shel.exe-c'

This result in the semantic reasoner of hypothesis generation program 150 determining that the set of observed data has an associated functionality of executing a process chain in which cmd.exe is a process 1 executed first, and then powerhsell.exe is a process 2 executed thereafter. This may be represented as 'Process 1→Process 2' or more specifically, in this example, 'cmd.exe→powershell.exe' The semantic reasoner makes this determination by applying logical rules and analyzing dependencies between the two processes.

At step 208, hypothesis generation program may then identify a series of alternative actions which, when performed, result in the determined functionality. For example, at this step hypothesis generation program 150 may leverage the semantic reasoner to check for alternative behaviors, orders, or actions, based on how a given endpoint or application functions. Returning to the above example, at this step hypothesis generation program 150 may leverage the semantic reasoner to determine that for the exemplary set of observed data, the associated process tree data may be associated with an alternative possibility that would result in the determined functionality, in this case 'msqql.exe' may replace 'cmd.exe'. Hypothesis generation program 150 is thus functionally identifying and recommending alternate possibilities with similar context that are expected to result in a similar behavior for a given process flow in a set of observed data.

Thereafter at 210, hypothesis generation program 150 may generate, based on the mapped set of observed data and the identified series of alternative actions, a conditional hypothesis corresponding to a process flow. At this step, hypothesis generation program 150 may leverage a model configured to utilize a generation element to generate a conditional hypothesis corresponding to a process flow. The leveraged model (as shown in FIG. 3, described below) may have an encoder-decoder architecture. Thus, the model may include a generation element which leverages a decoder to generate a conditional hypothesis corresponding to a process flow based on the mapped set of observed data (mapped with historical data) and the identified series of alternative actions. Accordingly, the generated conditional hypothesis will include a process tree which is not based on observed actual data, but is instead a generated hypothesis corresponding to a new process flow which is based on the context of the observed set of data, historical data, and conditional reasoning analysis regarding expected functionality. For example, if the exemplary set of observed data 'D1' corresponds to a process tree or process flow in which an exemplary 'process 1' flows into an exemplary 'process 2', then at this step, conditional hypothesis generation program 150 may generate a conditional hypothesis including an exemplary 'process 1' flowing into an exemplary 'process 3'. Returning to the above example, the original process flow of 'cmd.exe→powershell.exe' (process 1-process 2) may at this step be replaced by the generated hypothesis of 'mssql.exe→powershell.exe' (process 3-process 2) This new process flow may now be leveraged by complementary computer security systems to perform enhanced threat detection techniques which leverage not only observed data, but conditional hypotheses expected to result in similar behavior in order to detect threats in a more proactive and efficient manner. This example is shown in FIG. 4 and will be described in greater detail below in connection with FIG. 4.

In embodiments, hypothesis generation program 150 may be configured to leverage the generated hypotheses from illustrative process 200 described above in a feedback loop designed to store the generated hypotheses within any suitable storage mechanism, such the generated hypotheses become historical data that may be utilized to continuously improve the computer security system employing hypothesis generation program 150. This process may include, for example, leveraging an exemplary pre-trained model of hypothesis generation program 150 having an encoder-decoder architecture to vectorize the generated hypotheses and store them within a suitable storage system.

FIG. 3 illustrates exemplary model architecture 300 including an exemplary encoder-decoder model that may be leveraged during exemplary processes of conditional hypothesis generation for enterprise process trees according to at least one embodiment. In FIG. 3, exemplary model architecture 300 may include an encoder 320 configured to vectorize exemplary process flows 310, a latent vector at 330 functioning as an intermediate layer of the encoder-decoder model (where the variable 'X' of FIG. 3 is being processed), and a decoder at 340. By way of background, it is envisioned that exemplary models of hypothesis generation program 150 may be leveraged for vectorizing of process trees which creates embedding vectors (i.e., process embeddings) that provide a compact representation of computer processes and the relative meanings of the computer processes. These process embeddings represent an improvement over sparse representations used in conventional heuristic representation. It is envisioned that computer security systems leveraging hypothesis generation program 150 may detect malicious activity by learning and leveraging the process embeddings as part of fitting a neural network on text data. Decoder 340 may then be leveraged to generate a resulting process flow at 350.

Figure 4:
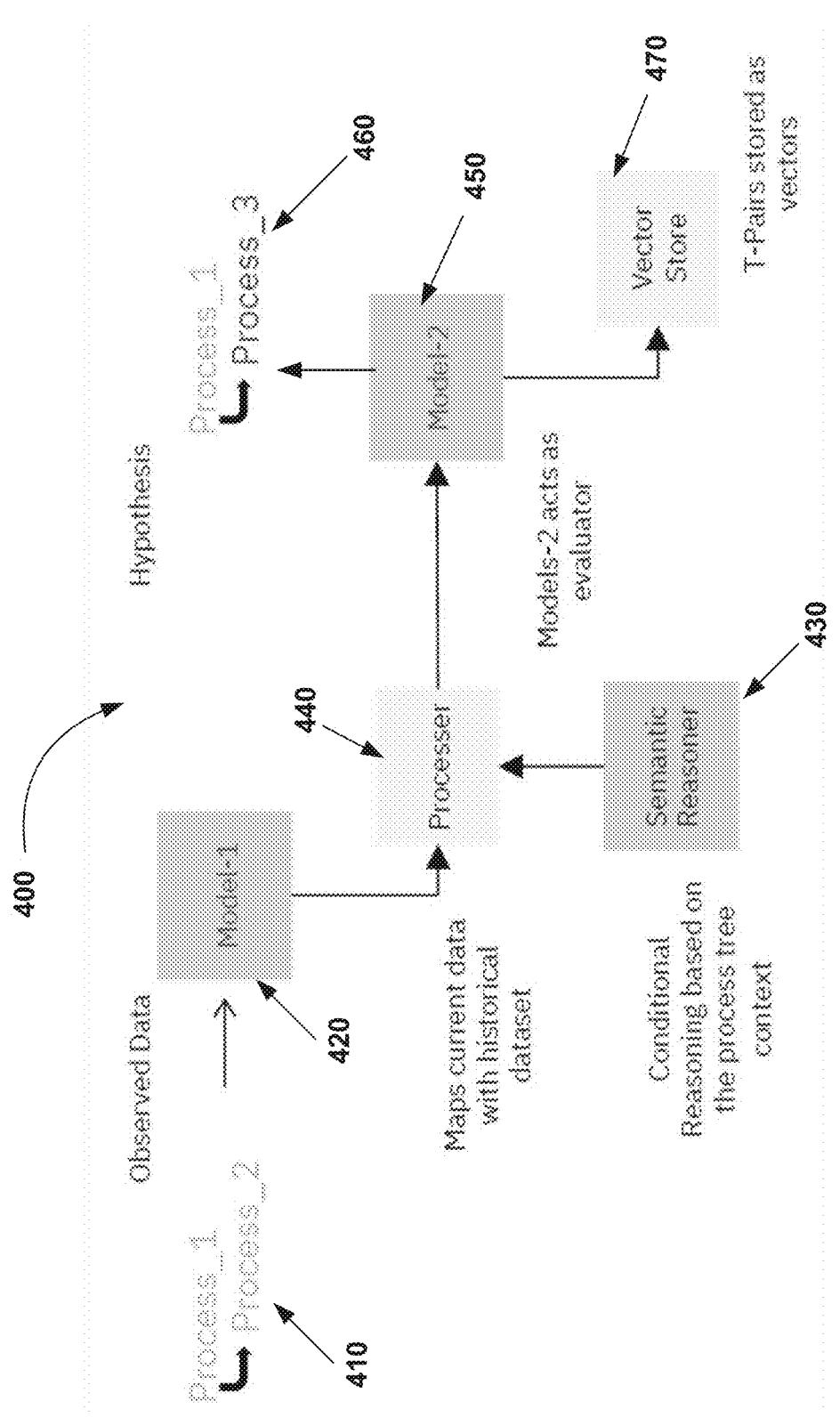
FIG. 4 illustrates exemplary system architecture that may be utilized to perform an exemplary process of conditional hypothesis generation for enterprise process trees according to at least one embodiment.

FIG. 4 illustrates exemplary system architecture 400 that may be utilized to perform an exemplary process of conditional hypothesis generation for enterprise process trees according to at least one embodiment. For example, exemplary system architecture may be leveraged to perform illustrative process 200 as described above. As shown in FIG. 4, exemplary system architecture may include a set of observed data at 410, represented by 'Process 1-Process 2' that is fed into an exemplary pretrained 'Model-1' at 420 configured to perform a first series of steps during a first 'Stage 1'. During Stage 1, the exemplary model 420 may be configured to map the set of observed data 410 with historical datasets and leverage a semantic reasoner 430 configured to perform conditional reasoning based on process tree content. The mapped data and conditional reasoning data are then fed into a processer 440 of exemplary 'Model-1' at 420. The exemplary model may then initialize a second stage represented by 'Model-2' at 450. In this second stage, the exemplary 'Model-2' at 450 may function as an evaluator, leveraging the data and insights from stage 1 to determine alternative possibilities for achieving similar functionality based on the appropriate context. Exemplary 'Model-2' at 450 may then leverage a suitable generation element including a decoder (not shown) to generate a conditional hypothesis at 460 including a new process flow represented by 'Process 1-Process 3'. Also at this stage, exemplary 'Model-2' at 450 may then vectorize the generated conditional hypothesis 460 for subsequent storage at 470 within any suitable storage mechanism such that the newly generated hypothesis may be leveraged by a computer security system employing hypothesis generation program 150. In embodiments, received sets of observed data from the target system, and data processed and generated by various components (described above) leveraged by hypothesis generation program 150 may be stored within an accessible shared storage mechanism, such as a database (not shown).

Figure 5:
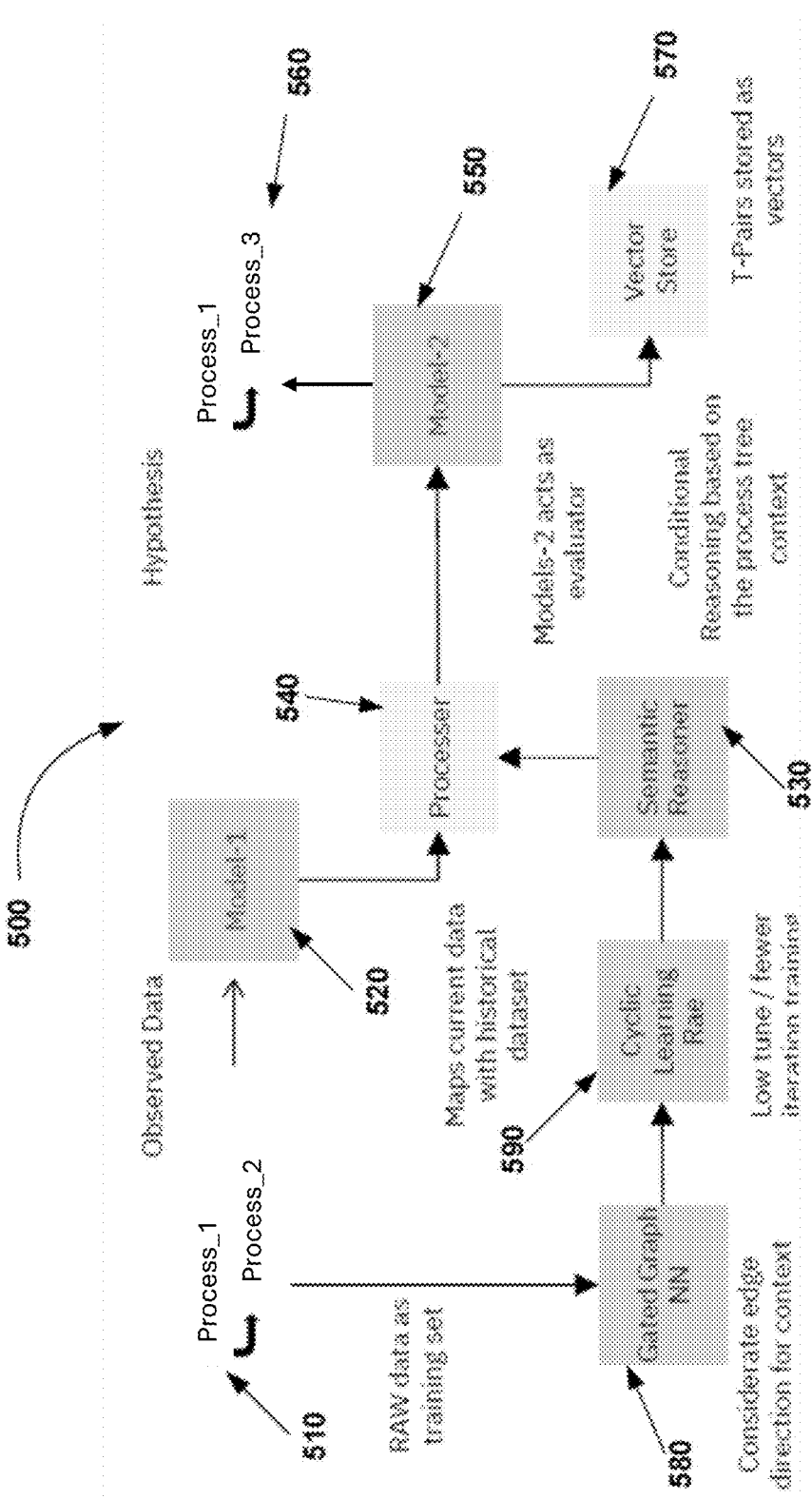
FIG. 5 illustrates alternative exemplary system architecture that may be utilized to perform an exemplary process of conditional hypothesis generation for enterprise process trees according to at least one embodiment.

In some embodiments, hypothesis generation program 150 may be employed with computer security systems that are monitoring target environments that operate at larger scales and involve multi-stage processes having a variety of directional implications with respect to dependencies and relationships between relevant processes and the order in which they may be executed. Accordingly, in some embodiments, hypothesis generation program 150 may be configured to include and leverage additional steps and components to accommodate these types of complex environments. FIG. 5 illustrates alternative exemplary system architecture 500 which includes such additional components that may be utilized to perform an exemplary process of conditional hypothesis generation for enterprise process trees. As shown in FIG. 5, exemplary system architecture 500 (similarly to exemplary system architecture 400) includes a set of observed data at 510, represented by 'Process 1-Process 2', an exemplary 'Model-1' at 520 for initializing a first stage of actions, an exemplary semantic reasoner 530, an exemplary processer 540, and an exemplary 'Model-2' at 550 to represent the initializing of a second stage of actions to be taken by the model, a generated hypothesis 560, and a 'vector storing' step 570 to store a vectorized hypothesis. FIG. 5 further includes a gated graph neural network (GGNN) 580, and a 'Cyclic Learning Rate' step at 590. In the embodiment shown in FIG. 5, where sets of observed data 510 are used as training sets, the exemplary GGNN 580 may be leveraged by hypothesis generation program 150 to analyze directionality and perform logical screening on data to learn underlying patterns and logical relationships between processes. In other words, GGNN 580 may be leveraged to perform logical screenings and determine the directionality of processes within process trees, identifying potential sequences of events, dependencies, and causal relationships that may subsequently be leveraged by computer security systems to detect specific security threats or anomalies. GGNN 580 may further consider edge direction for context, enhancing its ability to capture nuanced relationships and information flow patterns within directed graphs. As discussed above, these functions and features of GGNN 580 are particularly useful in large-scale cybersecurity environments in which there are a large number of processes, workflows, and process trees with distinct directionality and logical dependencies that should be considered for optimal threat detection. In such embodiments, hypothesis generation program 150 may further include a 'Cyclic Learning Rate' step at 590. In such embodiments, 'Cyclic Learning Rate' techniques at 590 may be employed by the utilized 'Model' of hypothesis generation program 150 (represented at 520 and 550 where the Model of hypothesis generation program 150 is leveraged to initialize the first and second stages of exemplary processes as shown) to ensure faster and more accurate updating of the model. This practically allows for users or analysts to get latest and most updated predictions based on newly observed data more quickly, especially in environments that are more complex and larger scale and benefit most from more efficient re-learning processes such as the cyclic learning rate employed at 590. It should be noted that the learning techniques at 590 may be utilized to continuously update the model employed by hypothesis generation program 150 by leveraging data stored that is derived from the target system, or any components of hypothesis generation program 150 and its employed model. Typically, all of this data may accessible and stored within a shared accessible storage system or database.

It may be appreciated that hypothesis generation program 150 has thus provided conditional hypothesis generation for enterprise process trees that may be leveraged by computer security techniques for improved threat detection. Described embodiments allow for conditional hypothesis generation that produces alternate possibilities (process flows) by leveraging similar contexts to original process trees associated with the received observed data. Described embodiments further leverage accessible historical data to further support hypothesis generation based on aligned and mapped semantics without deviating from original context. Furthermore, described embodiments may include feedback loops configured to store the generated hypotheses and process flows to continuously add to the available historical data to constantly improve the ability of described embodiments to perform conditional hypothesis generation. Thus, described embodiments may be leveraged to generate large volumes of alternate possibilities or process flows that may be utilized within improved computer security techniques or systems to engage in proactive threat detection, perform more efficient anomaly detection, and can continuously improve and learn to address evolving threats in a more timely manner.

Presently described embodiments may relate to the following clauses:

Clause 1: A computer-based method for conditional hypothesis generation for enterprise process trees, the method including: receiving a set of observed data, mapping the set of observed data with accessible historical data, performing conditional reasoning to determine, based on a process tree context for the set of observed data, functionality associated with the observed data, and identify a series of alternative actions which, when performed, result in the determined functionality, and generating, based on the mapped set of observed data and the identified series of alternative actions, a conditional hypothesis corresponding to a process flow. Described embodiments may leverage accessible historical data to support hypothesis generation based on aligned and mapped semantics without deviating from original context within observed datasets. This allows described embodiments to generate large volumes of alternate possibilities or process flows that may be utilized within improved computer security techniques or systems to engage in proactive threat detection, perform more efficient anomaly detection, and can continuously improve and learn to address evolving threats in a timelier manner.

Clause 2: The computer-based method of clause 1, further including generating a vector representation of the generated conditional hypothesis corresponding to the process flow. Described embodiments may utilize an exemplary model having encoder-decoder architecture to generate the vector representations for generated condition hypotheses such that the output is within a unique medium that may leveraged in additional capacities.

Clause 3: The computer-based method of any of the preceding clauses 1-2, further including storing the generated vector representation of the generated conditional hypothesis corresponding to the process flow in a storage mechanism. Described embodiments may store the vector representations within the storage mechanism to allow for the stored vector representations to be continuously incorporated into systems employing described embodiments such that an accessible set of historical data is continuously updated, allowing various systems that leverage the historical data to improve over time as access to more data increases.

Clause 4: The computer-based method of any of the preceding clauses 1-3, further including: leveraging a gated graph neural network to analyze directionality and perform logical screening on the set of observed data to identify underlying patterns and logical relationships between processes within the set of observed data. This allows described embodiments to more efficiently and accurate generate conditional hypotheses when employed with computer security systems that are monitoring target environments that operate at larger scales and involve multi-stage processes having a variety of directional implications with respect to dependencies and relationships between relevant processes and the order in which they may be executed.

Clause 5: The computer-based method of any of the preceding clauses 1-4, where the received set of observed data includes a series of process trees derived from a target system being monitored for security threats. Accordingly, described embodiments may leverage the contextual features of a typical process tree to ensure that the generated conditional hypotheses are based upon sufficient relevant context, both semantic and logical, with respect to the received sets of observed data.

Clause 6: The computer-based method of any of the preceding clauses 1-5, where the conditional hypothesis corresponding to the process flow is generated by leveraging a pre-trained model having an encoder-decoder architecture. Described embodiments may include and leverage a generation element which leverages the decoder features of an employed model to generate a conditional hypothesis corresponding to a process flow based on the mapped set of observed data (mapped with historical data) and the identified series of alternative actions.

Clause 7: The computer-based method of any of the preceding clauses 1-6, where the pre-trained model leverages a semantic reasoner to perform the conditional reasoning. Described embodiments may leverage the semantic reasoner to apply logical rules, inference mechanisms, and semantic querying to identify patterns, correlations, and dependencies between the processes in the set of observed data, as well as determine associated functionalities.

Clause 8: A computer system, the computer system including one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method including: receiving a set of observed data, mapping the set of observed data with accessible historical data, performing conditional reasoning to, determine, based on a process tree context for the set of observed data, functionality associated with the observed data, and identify a series of alternative actions which, when performed, result in the determined functionality, and generating, based on the mapped set of observed data and the identified series of alternative actions, a conditional hypothesis corresponding to a process flow. Thus, computer systems in accordance with described embodiments may generate large volumes of alternate possibilities or process flows that may be utilized within improved computer security techniques or systems to engage in proactive threat detection, perform more efficient anomaly detection, and can continuously improve and learn to address evolving threats in a timelier manner.

Clause 9: The computer system of clause 8, the performed method further including generating a vector representation of the generated conditional hypothesis corresponding to the process flow. Described embodiments may utilize an exemplary model having encoder-decoder architecture to generate the vector representations for generated condition hypotheses such that the output is within a unique medium that may leveraged in additional capacities.

Clause 10: The computer system of any of the preceding clauses 8-9, the performed method further including storing the generated vector representation of the generated conditional hypothesis corresponding to the process flow in a storage mechanism. Described embodiments may store the vector representations within the storage mechanism to allow for the stored vector representations to be continuously incorporated into systems employing described embodiments such that an accessible set of historical data is continuously updated, allowing various systems that leverage the historical data to improve over time as access to more data increases.

Clause 11: The computer system of any of the preceding clauses 8-10, the performed method further including: leveraging a gated graph neural network to analyze directionality and perform logical screening on the set of observed data to identify underlying patterns and logical relationships between processes within the set of observed data. This allows described embodiments to more efficiently and accurate generate conditional hypotheses when employed with computer security systems that are monitoring target environments that operate at larger scales and involve multi-stage processes having a variety of directional implications with respect to dependencies and relationships between relevant processes and the order in which they may be executed.

Clause 12: The computer system of any of the preceding clauses 8-11, where the received set of observed data includes a series of process trees derived from a target system being monitored for security threats. Accordingly, described embodiments may leverage the contextual features of a typical process tree to ensure that the generated conditional hypotheses are based upon sufficient relevant context, both semantic and logical, with respect to the received sets of observed data.

Clause 13: The computer system of any of the preceding clauses 8-12, where the conditional hypothesis corresponding to the process flow is generated by leveraging a pre-trained model having an encoder-decoder architecture. Described embodiments may include and leverage a generation element which leverages the decoder features of an employed model to generate a conditional hypothesis corresponding to a process flow based on the mapped set of observed data (mapped with historical data) and the identified series of alternative actions.

Clause 14: The computer system of any of the preceding clauses 8-13, where the pre-trained model leverages a semantic reasoner to perform the conditional reasoning. Described embodiments may leverage the semantic reasoner to apply logical rules, inference mechanisms, and semantic querying to identify patterns, correlations, and dependencies between the processes in the set of observed data, as well as determine associated functionalities.

Clause 15: A computer program product, the computer program product including: one or more computer-readable tangible storage medium and program instructions stored on at least one of the one or more computer-readable tangible storage medium, the program instructions executable by a processor capable of performing a method, the method including: receiving a set of observed data, mapping the set of observed data with accessible historical data, performing conditional reasoning to: determine, based on a process tree context for the set of observed data, functionality associated with the observed data, and identify a series of alternative actions which, when performed, result in the determined functionality, and generating, based on the mapped set of observed data and the identified series of alternative actions, a conditional hypothesis corresponding to a process flow. Thus, computer program products in accordance with described embodiments may generate large volumes of alternate possibilities or process flows that may be utilized within improved computer security techniques or systems to engage in proactive threat detection, perform more efficient anomaly detection, and can continuously improve and learn to address evolving threats in a timelier manner.

Clause 16: The computer program product of clause 15, the performed method further including generating a vector representation of the generated conditional hypothesis corresponding to the process flow. Described embodiments may utilize an exemplary model having encoder-decoder architecture to generate the vector representations for generated condition hypotheses such that the output is within a unique medium that may leveraged in additional capacities.

Clause 17: The computer program product of any of the preceding clauses 15-16, the performed method further including storing the generated vector representation of the generated conditional hypothesis corresponding to the process flow in a storage mechanism. Described embodiments may store the vector representations within the storage mechanism to allow for the stored vector representations to be continuously incorporated into systems employing described embodiments such that an accessible set of historical data is continuously updated, allowing various systems that leverage the historical data to improve over time as access to more data increases.

Clause 18: The computer program product of any of the preceding clauses 15-17, the performed method further including: leveraging a gated graph neural network to analyze directionality and perform logical screening on the set of observed data to identify underlying patterns and logical relationships between processes within the set of observed data. This allows described embodiments to more efficiently and accurate generate conditional hypotheses when employed with computer security systems that are monitoring target environments that operate at larger scales and involve multi-stage processes having a variety of directional implications with respect to dependencies and relationships between relevant processes and the order in which they may be executed.

Clause 19: The computer program product of any of the preceding clauses 15-18, where the received set of observed data includes a series of process trees derived from a target system being monitored for security threats. Accordingly, described embodiments may leverage the contextual features of a typical process tree to ensure that the generated conditional hypotheses are based upon sufficient relevant context, both semantic and logical, with respect to the received sets of observed data.

Clause 20: The computer program product of any of the preceding clauses 15-19, where the conditional hypothesis corresponding to the process flow is generated by leveraging a pre-trained model having an encoder-decoder architecture. Described embodiments may include and leverage a generation element which leverages the decoder features of an employed model to generate a conditional hypothesis corresponding to a process flow based on the mapped set of observed data (mapped with historical data) and the identified series of alternative actions.

It may be appreciated that FIGS. 2-5 provide only illustrations of an exemplary implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for conditional hypothesis generation for enterprise process trees, the method comprising:

receiving a set of observed data;

mapping the set of observed data with accessible historical data;

performing conditional reasoning to:

determine, based on a process tree context for the set of observed data, functionality associated with the observed data; and identify a series of alternative actions which, when performed, result in the determined functionality;

generating, based on the mapped set of observed data and the identified series of alternative actions, a conditional hypothesis corresponding to a process flow;

generating a vector representation of the generated conditional hypothesis corresponding to the process flow; and performing, by a computer security system, threat detection techniques that leverage the set of observed data and the conditional hypothesis to detect at least one threat.

2. The computer-based method of claim 1, further comprising:

storing the generated vector representation of the generated conditional hypothesis corresponding to the process flow in a storage mechanism.

3. The computer-based method of claim 1, further comprising:

leveraging a gated graph neural network to analyze directionality and perform logical screening on the set of observed data to identify underlying patterns and logical relationships between processes within the set of observed data.

4. The computer-based method of claim 1, wherein the received set of observed data comprises a series of process trees derived from a target system being monitored for security threats.

5. The computer-based method of claim 1, wherein the conditional hypothesis corresponding to the process flow is generated by leveraging a pre-trained model having an encoder-decoder architecture.

6. The computer-based method of claim 5, wherein the pre-trained model leverages a semantic reasoner to perform the conditional reasoning.

7. A computer system comprising:

a processor set;

one or more computer-readable storage media; and program instructions stored on the one or more computer-readable storage media to cause the processor set to perform operations comprising:

receiving a set of observed data;

mapping the set of observed data with accessible historical data;

performing conditional reasoning to:

determine, based on a process tree context for the set of observed data, functionality associated with the observed data; and identify a series of alternative actions which, when performed, result in the determined functionality;

generating, based on the mapped set of observed data and the identified series of alternative actions, a conditional hypothesis corresponding to a process flow;

generating a vector representation of the generated conditional hypothesis corresponding to the process flow; and performing, by a computer security system, threat detection techniques that leverage the set of observed data and the conditional hypothesis to detect at least one threat.

8. The computer system of claim 7, wherein the operations further comprise:

storing the generated vector representation of the generated conditional hypothesis corresponding to the process flow in a storage mechanism.

9. The computer system of claim 7, wherein the operations further comprise:

leveraging a gated graph neural network to analyze directionality and perform logical screening on the set of observed data to identify underlying patterns and logical relationships between processes within the set of observed data.

10. The computer system of claim 7, wherein the received set of observed data comprises a series of process trees derived from a target system being monitored for security threats.

11. The computer system of claim 7, wherein the conditional hypothesis corresponding to the process flow is generated by leveraging a pre-trained model having an encoder-decoder architecture.

12. The computer system of claim 11, wherein the pre-trained model leverages a semantic reasoner to perform the conditional reasoning.

13. A computer program product comprising:

one or more computer-readable storage media; and program instructions stored on the one or more computer-readable storage media to perform operations comprising:

receiving a set of observed data;

mapping the set of observed data with accessible historical data;

performing conditional reasoning to:

determine, based on a process tree context for the set of observed data, functionality associated with the observed data; and identify a series of alternative actions which, when performed, result in the determined functionality;

generating, based on the mapped set of observed data and the identified series of alternative actions, a conditional hypothesis corresponding to a process flow;

generating a vector representation of the generated conditional hypothesis corresponding to the process flow; and performing, by a computer security system, threat detection techniques that leverage the set of observed data and the conditional hypothesis to detect at least one threat.

14. The computer program product of claim 13, wherein the operations further comprise:

storing the generated vector representation of the generated conditional hypothesis corresponding to the process flow in a storage mechanism.

15. The computer program product of claim 13, wherein the operations further comprise:

leveraging a gated graph neural network to analyze directionality and perform logical screening on the set of observed data to identify underlying patterns and logical relationships between processes within the set of observed data.

16. The computer program product of claim 13, wherein the received set of observed data comprises a series of process trees derived from a target system being monitored for security threats.

17. The computer program product of claim 13, wherein the conditional hypothesis corresponding to the process flow is generated by leveraging a pre-trained model having an encoder-decoder architecture.

* * * * *